Figure 1:
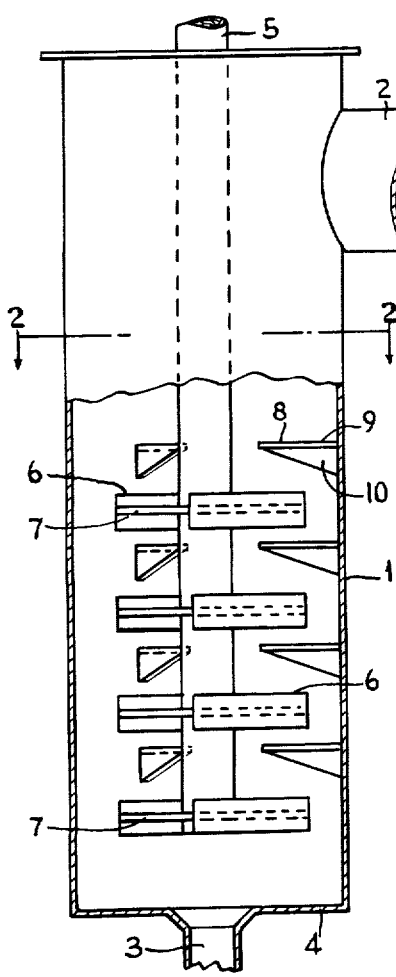

May 22, 1956 — M. M. EAKINS — 2,746,729

METHOD FOR HOMOGENIZING GLASS

Filed Aug. 5, 1952

INVENTOR.
MERLE M. EAKINS
BY Oscar L. Spencer
ATTORNEY

United States Patent Office 2,746,729
Patented May 22, 1956

2,746,729

METHOD FOR HOMOGENIZING GLASS

Merle M. Eakins, Ford City, Pa., assignor to Pittsburgh Plate Glass Company, Pittsburgh, Pa., a corporation Application August 5, 1952, Serial No. 302,688

2 Claims. (Cl. 259—8)

This invention is directed to homogenizing optical glass. It is specifically concerned with a method of stirring the glass so as to eliminate stria and cords resulting from the melting operation. The invention is further specifically concerned with performing such stirring operations as the glass is continuously passed through a relatively small upright cylinder at rates upward to 200 pounds per hour, depending upon the glass composition.

I am aware that it is old to stir optical glass for the purposes of eliminating inhomogeneities and one well-known prior art practice is to heat the glass in clay pots while stirring the molten glass in an ever-changing pattern and thereafter pouring the glass from the pot into molds. In such prior art operation only a small portion of the pot contents can be cast into commercially acceptable optical glass. I am also aware that prior art attempts at stirring glass in the fore-hearth of the heating furnace has been practiced with varying success. Another method of stirring glass while passing through a vertically disposed chamber is illustrated in DeVoe Patent No. 2,569,459 of October 2, 1951. Here the patentee attempts to secure removal of inhomogeneities of the glass by simultaneously stirring the glass in opposite directions so as to impose a shearing action thereon by means of oppositely disposed vanes vertically arranged along a longitudinal axis of rotation extending through the cylinder.

All these prior art methods attempt to eliminate the undesired inhomogeneities of the glass by either attenuating the stria and wall cords or by repeatedly shearing them. Theoretically, such prior art methods would result in a substantial elimination of the inhomogeneities, particularly where the viscosity and density of the liquid are of such a nature as to permit the disturbances set up in the material being stirred to continue within the liquid. As is well known, the viscosity of molten glass is such that any disturbances created by the stirrer blades are very rapidly dampened out and persist for only a short period of time. Viscosity may be defined as that property of a fluid which resists deformation. Hence, in a fluid of such high viscosity as glass, deformation is resisted regardless of the direction and speed of rotation of the blades, except in the immediate area of the blades.

In the present invention the size of the blades and their design are such as to obtain the desired homogeneity of the fluid passing the blades despite the recognized property of glass to resist deformation and continuance of turbulence set up in the molten glass by the moving blades. With a stirring device of the present invention, the molten glass, while passing the blades within the confines of the vertical cylinder, is so manipulated as to remove all inhomogeneities while rotating the blades at a speed of operation much lower than heretofore possible. For instance, in producing crown glass of optical quality the blades were rotated at a speed of about 25 to 35 R. P. M. In the case of denser glasses such as the flint and lead types, speeds up to 45 R. P. M. have been found to be effective. Recognizing that a rotating blade of most any design and having a direction of rotation either clockwise or counter-clockwise will, in the main, impart merely a circular motion to the glass passing through the cylinder, I have provided suitable baffle members at the sides of the cylinder walls to momentarily resist the circular movement of the glass and increase the attenuating properties of the stirring device.

Figure 2:
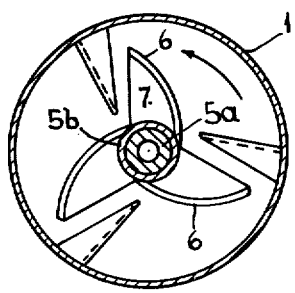
Figure 3:
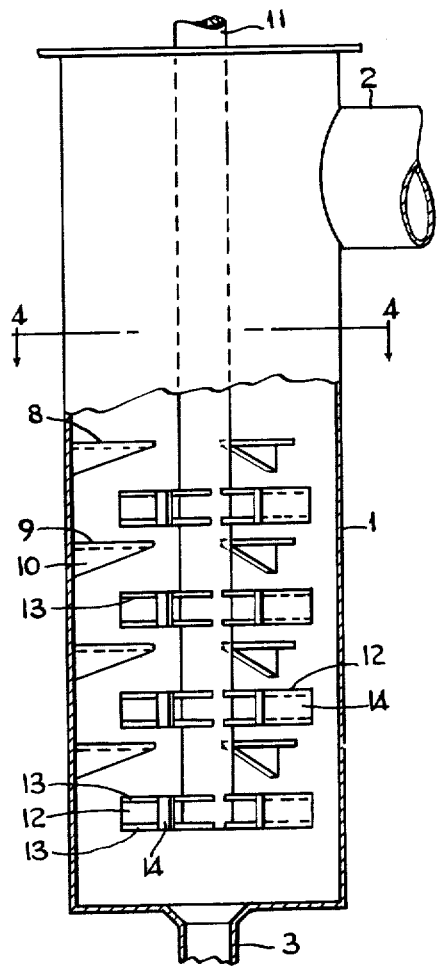
Figure 4:
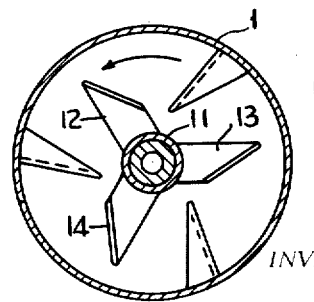

In the drawings forming part of the disclosure, Fig. 1 illustrates a side view of a cylinder and assembled stirring device, with portions of the side walls of the cylinder broken away to illustrate the stirring device construction; Fig. 2 is a section through the cylinder and stirring device taken on lines 2—2 of Fig. 1; Fig. 3 is a view similar to Fig. 1 showing a modification in the stirring blades; Fig. 4 is a section taken on the lines 4—4 of Fig. 3.

Referring now in detail to the drawings reference character 1 indicates a vertically disposed cylinder of about 4" diameter and 13" in length having a suitably disposed inlet 2 adjacent the top of the cylinder and a suitably disposed outlet 3 in the bottom wall 4 of the cylinder. The cylinder 1 may be of any suitable material which will withstand the high temperatures of the molten glass moving through the cylinder and which will not spall or otherwise contaminate the glass. Certain ceramic materials would be suitable for this purpose, however I propose to use platinum. In most instances it is desirable to surround the cylinder with suitable heating coils to control the drop in temperature of the glass during its passage through the cylinder. These coils are well-known in the art and for this reason have not been illustrated. Suspended within the cylinder 1 and in spaced relation to the bottom wall 4 thereof is a suitably supported stirring rod 5 which is mounted for rotation about the vertical axis of the cylinder. For purposes of economy I propose to make the rod 5 of a ceramic core 5a surrounded by a platinum sheath 5b. Suitably attached to the platinum sheath, as by welding, are the arcuate blades 6 mounted in vertically spaced relation on the stem 5. The blade 6 and associated webs 7 are preferably made of platinum and preferably three of them are spaced about 120° apart in a common plane to provide a group of blades. As shown in the drawings, four such groups of blades are spaced along the stem 5. Any suitable number of blade groupings may be used. However, I find four to be suitable for the purpose. As previously stated, the stem and the blades are preferably rotated in a counter-clockwise direction. However, satisfactory results have been obtained by a reverse or clockwise direction of rotation.

Attached to the inner periphery of the cylinder 1 and spaced about 120° about the periphery are suitable abutment members 8. These abutment members 8 are preferably mounted in groups of three above each of the groups of blades 6. Each abutment preferably comprises a substantially horizontally disposed top wall 9 and a vertically disposed side wall 10. Both the walls 9 and 10 are preferably triangular in shape, as shown, but may be of any other desirable shape.

When the homogenizing assembly is in use, molten glass from a suitable melting and fining furnace flows through inlet 2 into the cylinder 1 and out of the cylinder through the bottom outlet 3. The relative sizes of inlet 2 and outlet 3 are such that after the molten glass fills the cylinder 1 to adjacent the bottom side of inlet 2, the amount of glass within the cylinder is maintained throughout the period of operation. Although the apparatus is designed for a continuous operation it is possible to sufficiently insulate the cylinder and provide heat thereto to permit intermittent operation of the device provided the periods of inactivity are relatively short so as to prevent cooling the glass and clogging the cylinder 1. The top of the cylinder 1 is preferably closed to prevent surface cooling of the glass passing therethrough and the level of glass within the cylinder must at all times be maintained at a sufficient height above the blade 6 to prevent air from being entrapped in the glass by reason of any turbulency set up above the blade 6 or the baffle members 8.

The temperature at which the glass is passed through the cylinder 1 or the volume of glass per unit of time will vary with manufacturing conditions. The amount of glass which passes out of the cylinder is preferably regulated in accordance with the fabricating capacity of the machinery fed by the cylinder. The temperature of the glass in the fining portion of the furnace from which the cylinder 1 is fed will be about 2650° F. and varying therefrom depending upon the composition of the glass being melted. The glass upon entering the cylinder 1 and passing through to about the first abutment 8 will drop to about 2350° F. and by supplying suitable insulation and heat to the cylinder 1 at the stirring blades 6 and abutments 8 the glass is preferably maintained above 2000° F. This temperature will vary depending upon the amount of glass which passes through the cylinder and the composition of the glass. Preferably, the glass is not maintained in too fluid a condition since this impairs the attenuation of the stria. The rate at which the stirring device is operated is also dependent upon the composition of the glass and the amount of glass passed through the cylinder in a unit time. When using crown glass at a pass-through rate of 100 pounds per hour, I have found that rotation of the blades at 28 to 45 R. P. M. gave excellent homogenizing results. On the other hand, using flint glass at a through-put rate of 40 to 45 pounds, about 40 R. P. M. also produced satisfactory results. These results will vary as the size of cylinder, stirring rate and glass composition changes.

The theory of operation of the stirring device of the invention is rather difficult to demonstrate within a production unit. This is so because of the opaqueness of the cylinder 1 and the great heat of the molten glass. However, a crown glass has a viscosity of about 300 poises at the temperature of operation and a commercial product obtainable on the market under the trade name Vistanex has a similar viscosity at room temperatures of about 75 to 78° F. However, a crown glass has a specific gravity of 2.57 and the Vistanex has a density of only .90. Hence, it is necessary to modify the viscosity of the Vistanex by the addition of a suitable material such as mineral oil until the ratio of viscosity to density of the Vistanex is the same as the ratio of viscosity to density of the glass. This ratio I designate as kinematic viscosity since the viscous drag of the modified Vistanex at room temperature is the same as the viscous drag of the glass on the blades at operating temperatures of about 2000° F.

By placing suitable small particles in the Vistanex and of a specific gravity the same as the modified Vistanex, it is possible to observe movement of the Vistanex as it passed through cylinder 1 with the shaft 5 rotating. Recognizing that rotation of the blades 6 would induce the same circular movement of the glass within the cylinder as was the movement of the modified Vistanex in the cylinder, it was observed that in the absence of the baffles 8 the fluid, either glass or Vistanex, would follow a spiral path under the action of the stirring blades while passing through the cylinder. It was further observed that, whether the blades 6 were straight or curved as shown, the blades moving through the fluid caused a slight turbulency therein as the fluid moved up and over the blades 6 or down and under the blades 6. However, due to the viscosity of the glass and the test fluid, this turbulency was very quickly dampened out. By suitable test it was demonstrated that when the clearance between the ends of the blades 6 and the inner wall of the cylinder 1 was as little as ⅜", the turbulency was dampened out before reaching the cylinder wall 1 and in any event terminated there. It would, therefore, be desirable to have the ends of the blades 6 approach as close to the inner wall of the cylinder 1 as is practical. Manufacturing difficulties have demonstrated that a ⅜" clearance is about as close as is practical, it being recognized that hot platinum when coming into contact with most materials including platinum have a tendency to seize and substantially weld together at the temperatures of 2000° F. and above, under which the device operates. It was demonstrated, however, that mere rotation of the blades and flow of the fluid up and over, and down and under the blades sets up some turbulency which tended to attenuate the stria. Also it was demonstrated that by use of the curved blade some slight turbulency at the ends of the blades would tend to mechanically pull some of the glass inwardly away from the wall and, due to the viscous drag of the glass on the blades, would tend to move some of the glass from the inner wall of the cylinder inwardly towards the stem 5.

It is observed, however, that when the baffles 8 were installed upon the inside cylinder walls in the manner as shown in Fig. 1, mere passage of the glass through the cylinder without stirring would interrupt downward flow of the glass adjacent the walls as it impinged upon the face 9 of the baffles 8. When the blades 6 were rotated and a circular motion imparted to the fluid, it was apparent that as the fluid spiralled around the walls of the cylinder and downward it impinged upon a plurality of the faces 9 of the baffles, thereby preventing uninterrupted flow of the glass downwardly along the inner side walls of the cylinders and thus preventing any stria in the glass which may be at the walls, from passing through the cylinder without attenuation.

The blades 6 upon rotation between the baffles 8 also tend to shear the glass passing between the baffles since the blade 6 will be moving at a rate faster than the glass. In addition to this, the impingement of the glass upon the walls 10 of the baffles sets up a certain amount of turbulency which tends to mix the glass before the disturbance is dampened out due to the viscosity of the glass. Likewise, the turbulence set up about the walls 10 of the baffles and the face plates 9 of the baffles intermix with the turbulences set up above and below the blade 6 passing between the baffles which combination and intersection of these turbulences further mix the glass.

Referring now to the modification of my invention shown in Figs. 3 and 4 of the drawings, the cylinder 1 has baffles 8 disposed on the inner face of the walls thereof as in Fig. 1 of the drawings. The cylinder is also provided with a suitable inlet 2 and outlet 3 as hereinbefore described. A suitably supported shaft 11 is disposed within the cylinder 1 and is rotatable about the vertical axis of the cylinder. Groups of blades 12 are secured to the shaft 11, the blades 12 of each group being spaced about 120° apart. The blades 12, however, instead of being curved as in Figs. 1 and 2, comprise two vertically spaced portions 13 which are secured to the shaft 11 and their free ends are joined by a vertically disposed member 14. Each blade 13 has one edge longer than the other so that the member 14 lies in a plane inclined to the axis of rotation of the stem 11. It will be obvious, therefore, that when the stem 11 is rotated in a counter-clockwise direction a certain amount of the glass is scooped up between the blades 13 and the end members 14 and passes out through the narrow side of the opening between the blade portions 13. This change of direction of the glass sets up a turbulence which assists in mixing the glass and attenuating any stria which may be present. Likewise, as the blades 12 move between the abutments 8 the scooping action of the blades creates a greater turbulence between the abutments 8. Excepting for the foregoing, the action of the blades 12 imparts a circular motion to the glass as it moves through the cylinder in the same manner as done in Figs. 1 and 2.

It is to be understood that the specific details of a construction set forth in the foregoing specification are intended for purposes of illustration only and I do not wish to be limited thereby except as made necessary by the scope of the appended claims.

I claim:

1. A method of stirring glass comprising the steps of, continuously flowing molten glass by gravity through a stationary substantially cylindrical container at a rate to maintain the glass within the container at a substantially constant level, imparting a circular motion to the glass during its flow through the container, intermittently interrupting the free circular motion of the glass at the inner periphery of the cylinder during passage of the glass therethrough, and repeatedly shearing the glass within the area adjacent the periphery of the cylinder.

2. The method as in claim 1, wherein portions of the glass adjacent the periphery of the cylinder are being mechanically displaced inwardly throughout the stirring operation.

References Cited in the file of this patent

UNITED STATES PATENTS

| | | |
|---|---|---|
| 1,631,061 | Rankin | May 31, 1927 |
| 1,792,059 | Altwegg | Feb. 10, 1931 |
| 2,569,459 | DeVoe | Oct. 2, 1951 |
| 2,570,078 | Spremulli | Oct. 2, 1951 |
| 2,626,786 | McGlothlin | Jan. 27, 1953 |

Dedication 2,746,729.—*Merle M. Eakins*, Ford City, Pa. METHOD FOR HOMOGENIZING GLASS. Patent dated May 22, 1956. Dedication filed July 25, 1973, by the assignee, *PPG Industries, Inc.*

Hereby dedicates the remainder of its term to the free use and benefit of the People of the United States.

[*Official Gazette December 25, 1973.*]